Jan. 6, 1959
F. E. BUSSE
2,867,246
RECEPTACLE FILLER
Filed Dec. 20, 1955
2 Sheets-Sheet 1
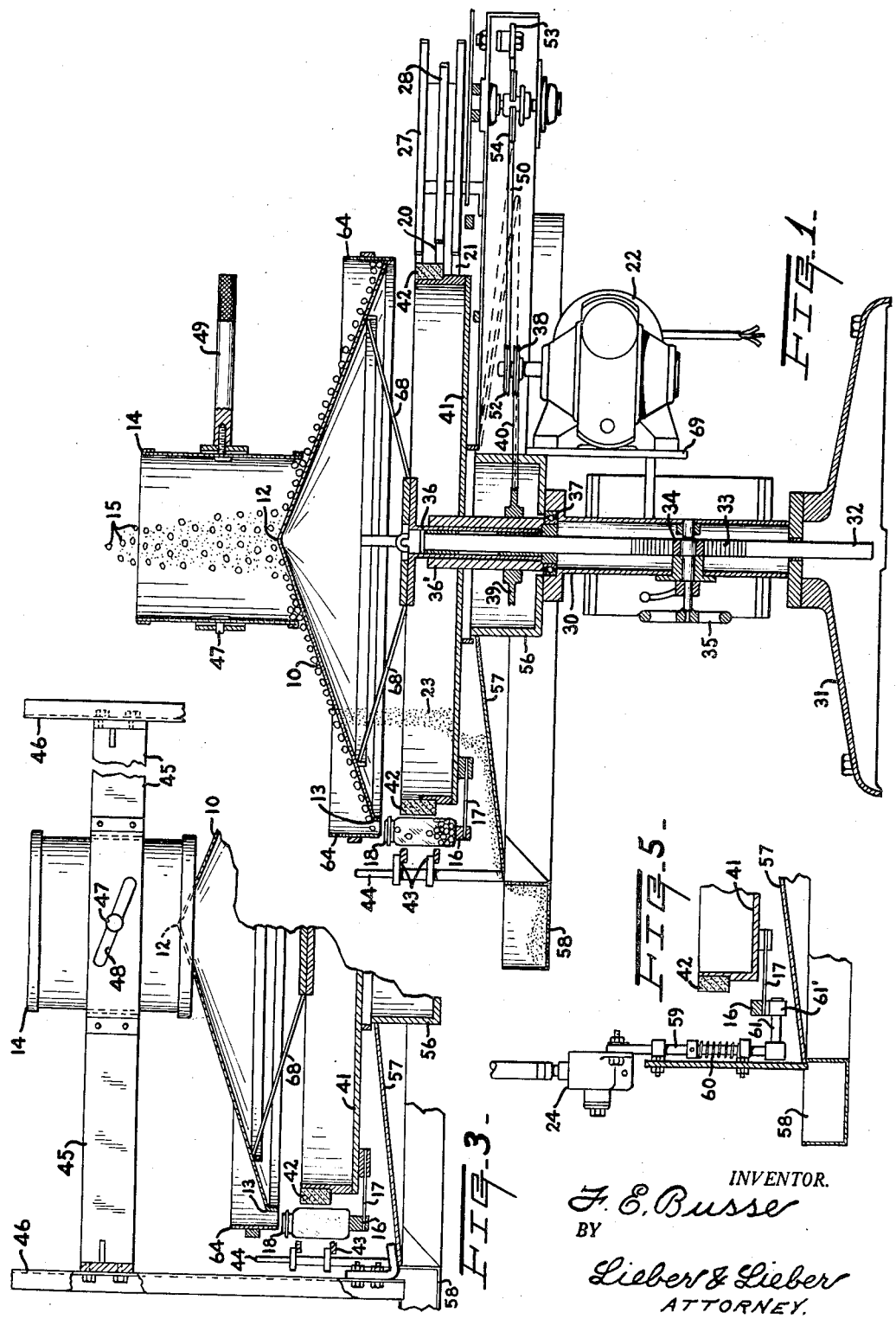
INVENTOR.
F. E. Busse
BY
Lieber & Lieber
ATTORNEY.

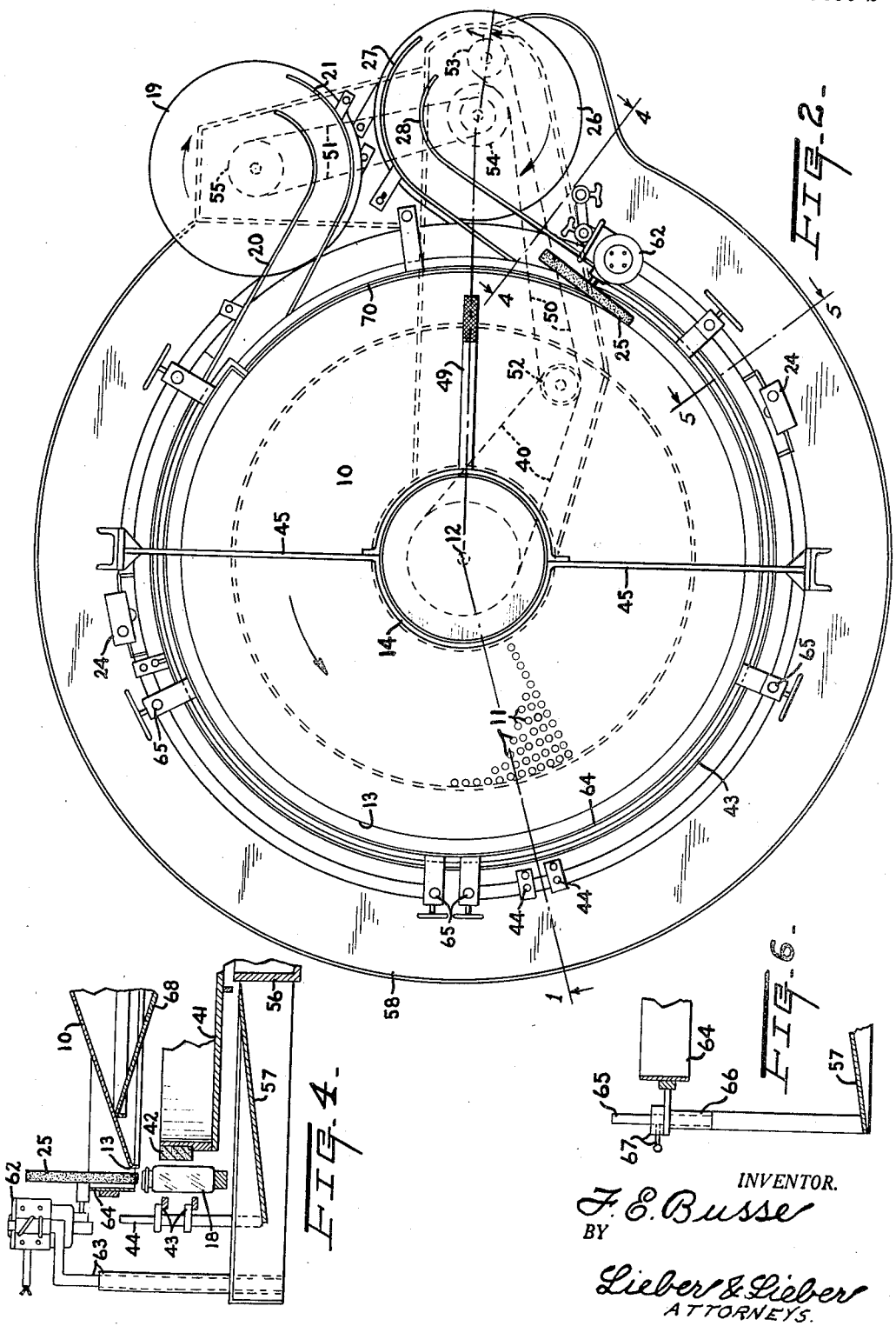

ID
2,867,246
RECEPTACLE FILLER

Floyd E. Busse, Berlin, Wis., assignor, by mesne assignments, to Consolidated Foundries and Mfg. Corp., a corporation of Delaware Application December 20, 1955, Serial No. 554,261

8 Claims. (Cl. 141—34)

The present invention relates generally to improvements in the art of filling receptacles, and relates more particularly to improvements in the construction and operation of apparatus for automatically filling receptacles such as jars, cans or the like with a commodity such as fruits or vegetables.

A primary object of the invention is to provide an improved receptacle filling device which is extremely simple, compact and durable in construction and which is moreover highly efficient and economical in operation.

A more specific object of my present invention is to provide an improved apparatus for automatically filling a succession of receptacles with desired quantities of relatively small objects as the receptacles are continuously advanced along a definite path and are vibrated to a controlled extent during such advancement.

Another specific object of this invention is to provide a novel and improved receptacle filler which is readily adjustable to accommodate receptacles of various sizes, which may be used for filling such receptacles with diverse commodities, and which may be readily operated by a novice with a minimum of attention.

Another specific object of the invention is to provide an improved receptacle filler wherein the product is conveyed with the aid of gravity over a revolving perforated conical surface to a plurality of receptacles to be filled, with the excess juices from the product being separated therefrom during the travel of the product to the receptacles.

Still another specific object of my invention is to provide an improved automatic receptacle filler wherein the receptacles are conveyed in succession on a resilient support which is vibrated in a novel manner to control the quantity of the product packed within the receptacles and wherein novel means are provided for effectively protecting the advancing vibrating receptacles against damage.

An additional specific object of my present invention is to provide an improved receptacle filler which embodies relatively few parts all of which are readily accessible for replacement or repair, which is quickly and easily universally adjustable, and which incorporates novel means for removing excess products from the filled receptacles in an automatic manner and during advancement thereof.

A further specific object of the present invention is to provide an improved receptacle filler comprising, means forming a perforated downwardly inclined conveying surface, means for supplying a product to be packed to the upper portion of the conveying surface, and means for supporting open-mouthed receptacles adjacent to and with the mouths thereof located below the lower edge of the conveying surface so that the product gravitating over the surface is guided to the receptacles as foreign matter is removed through the perforations in the surface.

These and other objects and advantages of the present improvement, and of the mode of constructing and detailed description.

A clear conception of the features constituting my present improvement, and of the mode of constructing and of utilizing a typical receptacle filling apparatus embodying the invention, may be had by referring to the drawing accompanying and forming a part of this specification wherein like reference characters designate the same or similar parts in the several views.

Fig. 1 is a vertical section through a typical receptacle filler embodying the improvements, the section being taken along the line 1—1 of Fig. 2;

Fig. 2 is a top view of the improved device;

Fig. 9 is a fragmentary part sectional view showing the hopper suspension and adjusting portion of the assemblage;

Fig. 4 is a fragmentary part sectional view showing the leveling brush and its associated mechanism, the section being taken along the line 4—4 of Fig. 2;

Fig. 5 is a fragmentary part sectional view showing one of the vibrators for the resilient receptacle support and taken along the line 5—5 of Fig. 2; and Fig. 6 is a fragmentary part sectional view showing a portion of the annular wall or plate for regulating the feed of the product to the receptacles and the means for removing and adjusting the same.

While the invention has been shown and described herein as being embodied in a typical apparatus for filling receptacles such as masonry jars with fruit or the like, it is not desired or intended to unnecessarily restrict the scope or utility of the improved features by reason of such limited disclosure; and it is also contemplated that certain specific descriptive terms used herein shall be given the broadest possible interpretation consistent with the disclosure.

Referring to the drawing, the improved receptacle filling apparatus shown therein as embodying the improvements comprises, in general, means such as an inverted cone-shaped conveyor 10 having perforations 11 therein to provide a perforated downwardly and outwardly inclined conveying surface terminating in a lower annular peripheral edge 13; means such as a downwardly open hopper 14 surrounding the apex 12 of the conveyor 10 for supplying a product 15 to be packed to the high portion of the conveyor; means such as an annular track 16 resiliently mounted as by means of leaf springs 17 for receiving and supporting a succession of open mouthed receptacles 18 adjacent to and with the mouths thereof positioned below the lower peripheral edge 13 of the conveyor 10; means such as a revolving driven disk 19 for advancing the receptacles 18 in succession between a pair of spaced annular guide members 20, 21 into position on the track 16; means such as a variable speed gear motor 22 drivingly coupled in a suitable manner with the conveyor 10 for rotating the same to aid gravitation of the product 15 downwardly over the surface thereof toward the lower peripheral edge with the juices and other foreign matter being removed from the gravitating product as indicated at 23 through the perforations 11 as the product is conveyed toward the edge 13 of the conveyor; means such as a suitable vibrating device 24 cooperable with the track 16 to vibrate the track and the receptacles 18 supported thereby during advancement of the receptacles with the track to thereby aid in packing the product 15 within the receptacles; means such as a revolving brush 25 adapted for peripheral coaction with overflow product conveyed to the mouths of the successive receptacles 18 for removing excess product and leveling the same in the receptacles; and means such as a suitably driven revolving disk 26 for receiving filled receptacles guided thereto between guide members 27, 28 and for removing the filled receptacles therefrom.

The entire unit is supported at the upper end of a tubular column 30 secured at the lower end thereof to a suitable base 31, and the conveyor 10 is supported on a shaft 32 extending axially through the column 30 and provided with a series of teeth 33 at an intermediate portion thereof which are cooperable with a pinion 34 rotatable by a hand wheel 35 or the like for raising and lowering the shaft 32 to thereby adjust the height of the conveyor 10 to accommodate receptacles 18 of varying heights as they are advanced with the track 16. To permit rotation of the conveyor 10, the upper portion of the shaft 32 is embraced by a hub member formed by inner and outer tubular elements 36, 36' respectively mounted on suitable bearings 37 and rotatably driven about the shaft 32 by the motor 22 in a suitable manner as by sprockets 38, 39 and chain 40, the hub elements 36, 36' being keyed together for simultaneous rotation but being relatively axially movable. The hub element 36' in turn is suitably secured to the radially extending support 41 for the inner annular receptacle guide 42 so as to cause the support 41 and track 16 carried thereby to revolve and advance the receptacles 18, the guide 42 having a bumper and guiding surface preferably formed of rubber or other cushioning material and being readily removable or replaceable by guides of various thicknesses so as to provide for centering of jars of diverse diameters in the proper position under the feeding edge 13 of the conveyor and the support 41 being perforated or formed of a series of arms to permit the foreign matter 23 to fall therethrough. Cooperating with the inner jar guide 42 to form a guideway for the receptacles 18, one or more readily removable stationary outer jar guides 43 are provided which may also be formed with rubber bumper or shock absorbing guiding elements, and these outer guides 43 may be supported in any suitable manner as by vertical posts 44 but should be readily removable and replaceable to permit reception of various sizes of receptacles.

The hopper 14 may conveniently be supported on a cross member or strut 45 which in turn may be secured to suitable vertical upright supports 46 as shown in Fig. 3, and to permit vertical adjustment of the hopper 14 to various heights in order to regulate the flow of the product 15 through the open hopper bottom and onto the surface of the conveyor 10, the hopper is provided with a laterally extending lug or projection 47 extending through and cooperable with an elongated inclined slot 48 in the supporting member 45 so that manual rotation of the hopper 14, as by means of a laterally projecting handle 49 suitably secured to the hopper, will cause the hopper to assume various positions of vertical adjustment relative to the conveyor surface. The receptacle inlet disk 19 as well as the discharge disk 26 may also be driven by the motor 22 through chains 50, 51 and sprockets 52, 53, 54, 55, and the use of such inlet and discharge disks cooperable with entrance guide-ways 20, 21 and discharge guide-ways 27, 28 respectively are old in the art, the inlet disk 19 being driven at a speed slightly in excess and the discharge disk 26 being driven at a speed slightly slower than the speed of advancement of the receptacle with the track 16 as is customary. Secured to the upper portion of the tubular supporting column 30 is a stationary housing and annular supporting member 56 having an inclined disk shaped member 57 secured thereto and extending therefrom below the conveyor for receiving separated juices and other foreign matter and conducting the same to an annular trough or pan 58 from which the juices may be periodically removed.

The vibrators 24 may be positioned at any desirable localities about the periphery of the conveyor 10, and these vibrators may be of any suitable available type adjustably operable by air or in some other convenient manner, the vibrator having an arm 59 projecting downwardly therefrom and operable against the action of a compression spring 60 for vibrating the receptacle supporting track 16 on its springs 17 through a radially extending finger 61 carrying suitable rollers 61' cooperating with the bottom of the track as shown in Fig. 5. The brush 25 for removing excess product from the successive receptacles 18, may be driven by a suitable electric motor 62 or the like carried by a vertically movable and adjustable support 63 which may be moved to various positions of adjustment to permit adjustment of the brush to receptacles of varying heights, the brush 25 being revolvable by the motor 62 about a horizontal axis with the periphery of the brush in close proximity with the mouths of the successive receptacles as shown in Fig. 4, and the brush 25 should, of course, be driven at relatively slow speed so as to prevent damage to the product as the receptacles are leveled. To prevent the product 15 from overflowing beyond the receptacles being filled and to guide the product to the receptacle mouths, an annular back-up guide or overflow preventing wall 64 is provided, the back-up guide 64 cooperating with the periphery of the conveyor 10 to form a feed opening and guide the product to the mouths of the receptacles 18 advancing with the track 16, and as shown particularly in Fig. 6, the back-up guide 64 may be supported in a convenient manner on vertical posts 65 or the like adapted to receive spacers 66 of various heights so as to compensate for and permit adjustments to receptacles of diverse heights, the back-up guide being also readily removable as by means of a collar 67 for permitting guides of various diameters to be substituted to vary the widths of the feed opening and the guide being positioned close to the periphery of the conveyor 10 along the portion 70 as shown in Fig. 2 to prevent feed of the product in the area between the receptacle inlet and outlet.

In operation, the conveyor height is first adjusted by means of the hand wheel 5 so that the receptacles 18 of a given height may be caused to move along the track 16 by means of the feed disk 19 with the mouths of the receptacles in close proximity to the peripheral edge 13 of the conveyor. The back-up guide 64 of proper diameter is also secured in position on the supports 65, and the motor 22 is started to thereby rotate the conveyor 10 in the direction of the arrow in Fig. 2 while simultaneously rotating the inlet disk 19 and discharge disk 26 in the directions of the arrows. As the product is fed to the hopper 14, the hopper may likewise be adjusted manually by means of the handle 49 to raise or lower the same relative to the adjacent portion of the conveyor surface and thereby control the amount of product flow over the conveyor surface from the apex 12 to the peripheral edge 13. As the conveyor 10 rotates, the product gravitates over the perforated surface thereof and the juices are separated from the product and are conducted by means of the member 57 to the trough or pan 58, and the product is conveyed and guided to the mouths of the successive advancing receptacles 18 through the feed opening provided between the conveyor periphery 13 and the back-up guide 64. As the receptacles 18 are supplied with the product, the vibrators operate to vertically vibrate the spring supported track 16 and the receptacles 18 supported thereby thus causing the product to pack to a desired extent within the receptacles, depending upon the amount of controlled vibration. As the receptacles are advanced with the track 16 between the cushioned guides 42, 43, toward the discharge end, the slowly rotating brush removes any excess product overflowing the receptacle mouths, and the filled receptacles are then conveyed between the discharge guide-ways 27, 28 by the discharge disk 26.

From the foregoing detailed description, it is believed apparent that the present invention contemplates the provision of an improved receptacle filling apparatus which is exceedingly simple, compact and durable in construction as well as highly efficient in actual operation. The improved apparatus is of unitary construction with all parts being mounted on and carried by the pedestal 30 and base 31, and all parts of the unit are readily adjustable to compensate for varying conditions and receptacle sizes. The inverted cone-shaped conveyor 10 may be conveniently supported from the top of the vertically adjustable shaft 32 as by means of any number of struts or radially extending arms 68, and the motor 22 may be secured to the column 30 and housing 56 as by means of a suitable bracket 69. The several parts of the improved apparatus may be conveniently manufactured of readily available materials, and all of the parts of the assemblage are quickly and easily accessible for cleaning, inspection or repair. Receptacle fillers embodying the several features of the present invention have been placed in actual commercial use and these units have proven highly successful and satisfactory in their performance.

It should be understood that it is not desired or intended to limit this invention to the exact details of construction or to the precise mode of use herein shown and described since various modifications within the scope of the appended claims may occur to persons skilled in the art to which this invention pertains.

I claim:

1. Receptacle filling apparatus comprising, means forming a perforated downwardly and outwardly inclined conveying surface terminating in a lower annular peripheral edge, means for supplying a product to be packed to the high portion of said conveying surface, an annular resiliently mounted track for supporting a succession of open-mouthed receptacles adjacent to and with the mouths thereof positioned below the lower peripheral edge of said conveying surface, means for moving said conveying surface to aid gravitation of the product thereover to the receptacles while foreign matter is removed from the gravitating product through the perforations in said surface, and means coacting with said resiliently mounted track for vibrating the same to aid in packing the product within the receptacles supported thereby.

2. Receptacle filling apparatus comprising, means forming a perforated downwardly and outwardly inclined conveying surface terminating in a lower annular peripheral edge, means for supplying a product to be packed to the high portion of said conveying surface, an annular track resiliently suspended on the free ends of cantilever springs for supporting a plurality of open-mouthed receptacles adjacent to and with the mouths thereof positioned below the lower peripheral edge of said conveying surface, means for moving the receptacles in succession along said track, means for rotating said conveying surface to aid gravitation of the product thereover to the receptacles while foreign matter is removed from the gravitating product through the perforations in said surface, and means coacting with said spring suspended track for vibrating the same as the receptacles are advanced therealong to aid in packing the product within the receptacles.

3. Receptacle filling apparatus comprising, a conveyor having a perforated downwardly and outwardly inclined conveying surface terminating in a lower annular peripheral edge, means for supplying a product to be packed to the high portion of said conveyor, an annular track resiliently suspended on the outer free ends of spaced radiating cantilever leaf springs for receiving and supporting a plurality of open-mouthed receptacles adjacent to and with the mouths thereof positioned below the lower peripheral edge of said conveyor, means for rotating said track to advance the receptacles therewith in succession below the peripheral conveyor edge, means for simultaneously rotating said conveyor to aid gravitation of the product over the surface thereof to the receptacles while foreign matter is removed from the gravitating product through the perforations in said surface, and a vibrator having a reciprocable arm located outwardly beyond said track and coacting therewith through a roller for vibrating said track as the receptacles are advanced therewith to aid in packing desired quantities of the product within the receptacles.

4. Receptacle filling apparatus comprising, a conveyor having a perforated inverted cone-shaped conveying surface terminating in an annular lower peripheral edge, a normally fixed but vertically movable support for said conveyor, a downwardly open hopper for supplying a product to be packed to the apex of said conveyor, means for moving said hopper axially to different positions of adjustment relative to said conveyor for regulating the rate of flow of the product to the conveying surface, means for supporting a succession of open-mouthed receptacles adjacent to and with the mouths thereof positioned below the lower edge of said conveyor, means for rotating said conveyor upon said support to aid gravitation of the product over the surface thereof to the receptacles while foreign matter is removed from the gravitating product through the perforations in said surface, means for moving said support to vary the distance between said receptacle supporting means and said lower conveyor edge in order to accommodate receptacles of different heights, and means for vibrating said receptacle supporting means to aid in packing the product within the receptacles supported thereby.

5. Receptacle filling apparatus comprising, a conveyor having a perforated inverted cone-shaped conveying surface terminating in a lower annular peripheral edge, a hopper for supplying a product to be packed to the apex of said conveyor, an annular resiliently supported revolvable track for receiving a succession of open-mouthed receptacles and supporting and advancing the same with the mouths thereof positioned adjacent to and below the lower edge of said conveyor, means for regulating the flow of the product from the hopper to the surface of the conveyor, means for moving the conveyor axially to different positions of adjustment relative to said track, means for rotating said conveyor to aid gravitation of the product over the surface thereof and supply an abundance of the product to the receptacles while foreign matter is removed from the gravitating product through the perforations in said surface, means for vibrating said track and the receptacles supported thereby to aid in packing the product within the receptacles, and a brush revolvable about an axis transverse to the path of movement of said track and peripherally cooperable with the mouths of the receptacles for removing excess product from the successive receptacles and leveling the same as they are advanced with said track.

6. A receptacle filler comprising, a rotary conveyor having an upper central apex and a conical perforated deck terminating in a lower annular peripheral edge, a hopper for depositing granular commodity upon the apex portion of said deck, an annular resiliently supported track for conducting upwardly open receptacles in succession below and adjacent to said conveyor edge, means for rotataing said conveyor to aid advancement of the commodity along said deck from said hopper to said receptacles while removing foreign matter by gravity through the deck perforations, and means for vibrating said track to aid in packing the commodity delivered over said edge within said receptacles.

7. A receptacle filler comprising, a rotary conveyor having an upper central apex and a conical perforated deck terminating in a lower annular peripheral edge, a hopper for depositing granular commodity upon the apex portion of said deck, an annular resiliently supported track for conducting upwardly open receptacles in succession below and adjacent to said conveyor edge, means for rotataing said conveyor to aid advancement of the commodity along said deck from said hopper to said receptacles while removing foreign matter by gravity through the deck perforations, means for vibrating said track to aid in packing the commodity delivered over said edge within said receptacles, and a device revolvable adjacent to said conveyor edge and being operable to level the commodity deposited into the successive receptacles by said conveyor.

8. A receptacle filler comprising, a rotary conveyor having an upper central apex and a conical perforated deck terminating in a lower annular peripheral edge, a hopper for depositing granular commodity upon the apex portion of said deck, an annular resiliently supported track for conducting upwardly open receptacles in succession below and adjacent to said conveyor edge, means for rotating said conveyor to aid advancement of the commodity along said deck from said hopper to said receptacles while removing foreign matter by gravity through the deck perforations, means for vibrating said track to aid in packing the commodity delivered over said edge within said receptacles, means for adjusting said hopper vertically relative to said deck, and means for adjusting said conveyor vertically relative to said track.

References Cited in the file of this patent

UNITED STATES PATENTS

| | | |
|---|---|---|
| 797,145 | Nickerson | Aug. 15, 1905 |
| 1,716,869 | Strandt et al. | June 11, 1929 |
| 2,055,075 | Gardner | Sept. 22, 1936 |
| 2,115,335 | Keck et al. | Apr. 26, 1938 |
| 2,515,594 | Fischman | July 18, 1950 |
| 2,567,052 | Carruthers | Sept. 4, 1951 |
| 2,692,702 | Church | Oct. 26, 1954 |
| 2,775,371 | Isserlis | Dec. 25, 1956 |
| 2,792,030 | Wahl | May 14, 1957 |

FOREIGN PATENTS

| | | |
|---|---|---|
| 240,566 | Great Britain | Oct. 8, 1925 |
| 635,222 | Germany | Sept. 12, 1936 |